July 7, 1936. H. S. WALKER 2,046,351
UNDERFLOOR DUCT BOX
Original Filed Nov. 25, 1933
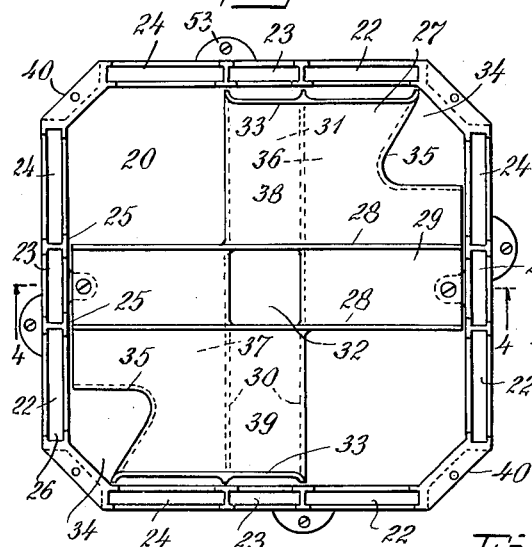
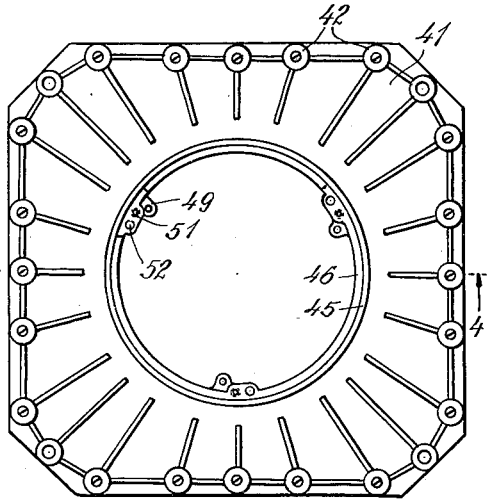
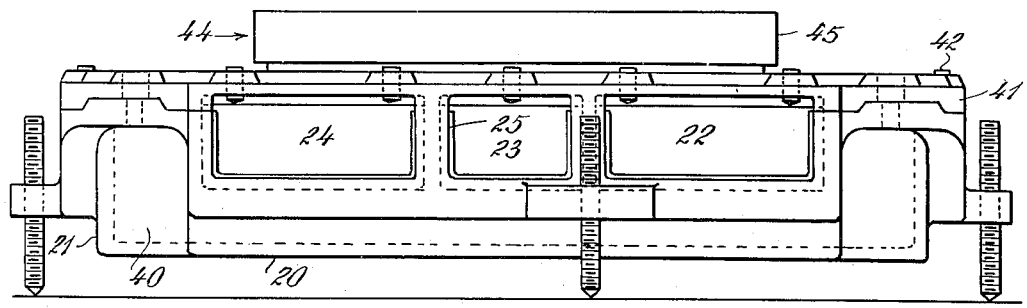
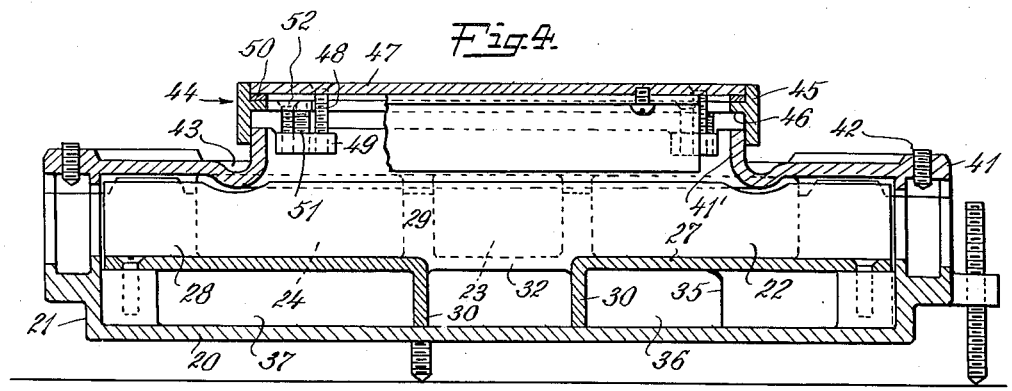
INVENTOR
Hervey S. Walker
BY
Pennie, Davis, Marvin + Edmonds
ATTORNEYS Patented July 7, 1936

2,046,351

UNITED STATES PATENT OFFICE 2,046,351

UNDERFLOOR DUCT BOX

Hervey S. Walker, Ardmore, Pa.

Original application November 25, 1933, Serial No. 699,649. Divided and this application May 26, 1934, Serial No. 727,713

3 Claims. (Cl. 247—15)

This invention relates to electrical wiring systems of the concealed type, such as are installed in the floors of office and similar buildings and known as underfloor duct systems. More particularly, the invention is concerned with a novel junction box for use in such systems at the intersections of the runs of duct, the new box being of simple rugged construction and providing a satisfactory and inexpensive device for permitting the crossing of the ducts, affording access to the wiring of the system, and supplying current to the system wiring from a distribution center. The new box is primarily intended for use in a wiring system made up of runs of duct with three ducts in each run, and its interior structure is such as to provide separate passages across the interior of the box in two directions through which the wiring from aligned ducts on opposite sides of the box may be led. It includes other features of novelty, however, which are applicable to various other boxes of the same general type.

The new box comprises a body which is formed in part of a bottom having integral side walls provided with openings for the reception of the ends of ducts and spaces which may be tapped to receive the ends of conduits for supply wires. Within the body is a removable partition member which rests on the bottom and is held in place by suitable means. This partition member has spaced vertical flanges on its top and bottom surfaces which partially define wiring passages extending both over and under the member, the top and bottom passages being closed by the bottom of the box and a top member, respectively. The top member has an opening through which access is afforded to the interior of the box and the opening is closed by a cover in a mounting which may be of such form as to provide adjustment of the height of the cover surface above the top member. The cover and its mounting may take different forms depending upon the type of floor construction in which the box is to be installed.

For a better understanding of the invention, reference may be made to the accompanying drawing, in which Fig 1 is a plan view of the new box with the top removed;

Fig. 2 is a plan view with the top in place and the cover removed;

Fig. 3 is a side view of the box; and

Fig. 4 is a sectional view on the line 4—4 of Fig. 2.

As illustrated in the drawing, the new box, which is made of metal, comprises a bottom member 20 having integral side walls 21, which are formed so as to give the box a generally square outline but with the corners cut off. Each wall is provided with three openings 22, 23, and 24 for the reception of ducts and these openings extend up to the upper edge of the side wall with adjacent openings separated by vertical members 25. The three walls of each opening are channelled, as indicated at 26, for the reception of packing material by which the entrance of moisture into the box around the ends of the ducts is prevented.

Within the box is a partition member 27, which may be made as a single casting and this member is provided at its top with spaced vertical flanges 28 which extend across the box and partially define a passage 29 for wiring which leads across the top of the partition member from the middle opening in one wall of the box to the corresponding opening in the opposite wall. On its under side the partition member is provided with similar spaced flanges 30 extending across the box and partially defining a passage 31 which leads beneath the partition member from the middle duct opening at one side of the box to the corresponding opening in the opposite wall. The passages 29 and 31 are at right angles and they are in communication through an opening 32 through the partition member. The flanges 30 rest on the bottom of the box so that the flanges, the bottom of the box, and the generally horizontal portion of the partition member cooperate to enclose the passage 31. The major horizontal portion of the partition member lies substantially in alignment with the bottom of the openings in the side walls of the box, and in order that wiring introduced through a central opening may be led into the passage 31, the horizontal portion of the partition member is turned upwardly adjacent the openings to which the passage leads with the edge of this upwardly turned portion 33 lying substantially in the plane of the top of the side walls.

At opposite corners of the box, the partition member is cut away to leave spaces 34 and the horizontal portion of the member has downward flanges 35 along the edges of each space, which contact with the bottom of the box. A passage 36 is then provided across the box beneath the partition member at one side of the passage 31, and the passage 36 extends from a duct opening 22 in one wall to the duct opening 22 in the opposite wall. One side wall of this passage is formed by a flange 30, and the passage is closed at its bottom by the bottom of the box and at its other side by a side wall of the box and by the downward flange on the partition member. A similar passage 37 beneath the partition member and parallel with the passage 36 lies on the other side of the passage 31, passage 37 connecting duct openings 24 in opposite walls of the box and being closed at its bottom by the bottom of the box and at its sides by a flange 30, the side wall of the box, and the edge flange on the partition member. At one end of each of the passages 36 and 37, the horizontal portion of the partition member is turned up as at 33 so that access to these passages through the duct openings in the walls of the box may be had.

Extending across the box above the partition member at one side of passage 29 is a passage 38 connecting duct openings 24 in opposite walls of the box, and this passage is defined in part by a flange 28, the horizontal portion of the partition member, the side wall of the box and the upwardly turned part 33 of the partition member. On the other side of the passage 29, there is a passage 39 extending over the partition member and connecting duct openings 22 in opposite walls of the box. This passage is defined in the same way as the passage 38, and the passages 29, 38, and 39 are all closed at the top by the top member of the box.

To facilitate making connections in the wiring, it is desirable that the passage 37 connecting the duct openings 24 and extending beneath the partition member should communicate with the passage 38 extending across the box above the partition member at right angles to passage 37 and also connecting duct openings 24 in opposite walls of the box. For this purpose, the partition member has no horizontal portion at the place where the passages cross and, therefore, in one corner of the box, the two passages are open to one another. Passage 36, extending beneath the partition member, likewise has a portion in common with passage 39, a part of the horizontal portion of the partition member having been omitted for the purpose.

The cut-away corners of the side walls of the box have blank walls 40 which may be tapped for the reception of conduits for feed wires and behind two of these walls lying diagonally across the box, the partition member is formed as previously mentioned to provide the spaces 34 for the introduction of the wiring. The downwardly extending edge flange 35 along the edge of each space 34 rests on the bottom of the box and thus serves to prevent contact of feed wiring for one tension with system wiring of another tension.

Resting on the top of the side walls of the bottom member is a top 41, held in place by screws in the usual way. This top member is formed to cooperate with the side walls of the box and the vertical members 25 so as to complete the openings 22, 23, and 24 in which the ends of the ducts are received, and the top carries grounding screws 42 which can be driven into engagement with the duct ends to hold them in place and ground the ducts to the box. In the middle of the top, there is a circular opening defined by an upstanding flange 41' and on the outside of the flange there is a circumferential channel 43. The opening is sufficiently large to overlie portions of the passages 29, 38 and 39 above the partition member, including parts of those passages where access is provided to the passages 31, 36, and 37 beneath the partition member.

The top of the box is provided with a cover 44 which may be of any suitable type. The cover construction shown in my copending application, Serial No. 699,649, filed November 25, 1933, of which this application is a division, offers numerous advantages when employed in boxes of the general form described, and I have accordingly shown its adaptation to the new box in the drawing.

As illustrated, the cover comprises a collar 45 surrounding the upstanding flange 41' of the opening and having an inner circumferential flange 46 overlying the top of the flange 41'. Mounted in the upper end of the collar on the inner flange 46 is a cover plate 47 which is held in place by screws 48 passing through the plate and into lugs 49 on flange 41'. A packing washer 50 is interposed between the cover plate and the flange 46 to make the construction watertight. In order to provide for proper leveling of the cover 44 relative to the floor surface, the collar is supported on adjustment screws 51 which are threaded into the lugs 49, and the collar is held in adjusted position on the flange by means of holding screws 52 which pass through a portion of the collar and into the lugs 49.

The new box affords numerous advantages over junction boxes heretofore used in three duct systems in that it is simple and relatively inexpensive to make and of rugged construction so that it will withstand handling during shipment and installation. Aside from the cover construction, the box comprises only three main parts, namely, the bottom, the partition member, and the top, and these can all be made of cast metal at low cost.

What I claim is:

1. A box for use in underfloor duct systems which comprises a body having a bottom with a flat inner surface and opposed side walls with openings in all said walls lying with their bottom edges substantially in a plane spaced above the bottom for the reception of the ends of ducts, a top mounted on the upper ends of said side walls and having an opening leading to the interior of the body, a cover for the top opening, and a partition member within the body and removable as a unit therefrom, said partition member having spaced vertical elements on its top partly defining a passage extending across the box over said member and connecting aligned duct openings in the opposed side walls of the body, spaced vertical elements on its under side terminating adjacent the inner surface of the bottom of the body and cooperating with said bottom partly to define a passage beneath said member extending between aligned duct openings in the opposed side walls of the body and lying at an angle to said passage first mentioned, and generally horizontal elements, each lying in an angle between said passages and forming the top of a passage beneath said member connecting a set of aligned duct openings in opposed side walls of the body, and the bottom of a similar passage above said member, said member lying substantially in the plane of the bottom of said duct openings and having portions extending upward substantially to the top of said openings, said portions lying at the ends of the passages beneath said member.

2. A box for use in underfloor duct systems which comprises a body having a bottom with a flat inner surface and opposed side walls with openings in all said walls lying with their bottom edges substantially in a plane spaced above the bottom for the reception of the ends of ducts, a top mounted on the upper ends of said side walls and having an opening leading to the interior of the body, a cover for the top opening, and a partition member within the body and removable as a unit therefrom, said partition member having spaced vertical elements on its top partly defining a passage extending across the box over said member and connecting aligned duct openings in the opposed side walls of the body, spaced vertical elements on its under side terminating adjacent the inner surface of the bottom of the body and cooperating with said bottom partly to define a passage beneath said member extending between aligned duct openings in the opposed side walls of the body and lying at an angle to said passage first mentioned, and generally horizontal elements, each lying in an angle between said passages and forming the top of a passage beneath said member connecting a set of aligned duct openings in opposed side walls of the body, and the bottom of a similar passage above said member, said horizontal elements each having a downwardly extending flange opposed to and spaced inwardly from a corner of the body of the box.

3. A box for use in underfloor duct systems which comprises a body having a bottom with a flat inner surface and opposed side walls with openings in all said walls lying with their bottom edges substantially in a plane spaced above the bottom for the reception of the ends of ducts, said body having cut-off corners adapted to be tapped for the reception of conduits, a top mounted on the upper ends of said side walls and having an opening leading to the interior of the body, a cover for the top opening, and a partition member within the body and removable as a unit therefrom, said partition member having spaced vertical elements on its top partly defining a passage extending across the box over said member and connecting aligned duct openings in the opposed side walls of the body, spaced vertical elements on its under side terminating adjacent the inner surface of the bottom of the body and cooperating with said bottom partly to define a passage beneath said member extending between aligned duct openings in the opposed side walls of the body and lying at an angle to said passage first mentioned, and generally horizontal elements, each lying in an angle between said passages and forming the top of a passage beneath said member connecting a set of aligned duct openings in opposed side walls of the body, and the bottom of a similar passage above said member, said member lying substantially in the plane of the bottom of said duct openings and having portions extending upward substantially to the top of said openings at the ends of the passages beneath said member, each horizontal element also having a downwardly extending flange opposed to and spaced inwardly from a cut-off corner of said body.

HERVEY S. WALKER.